Patented Jan. 22, 1929.

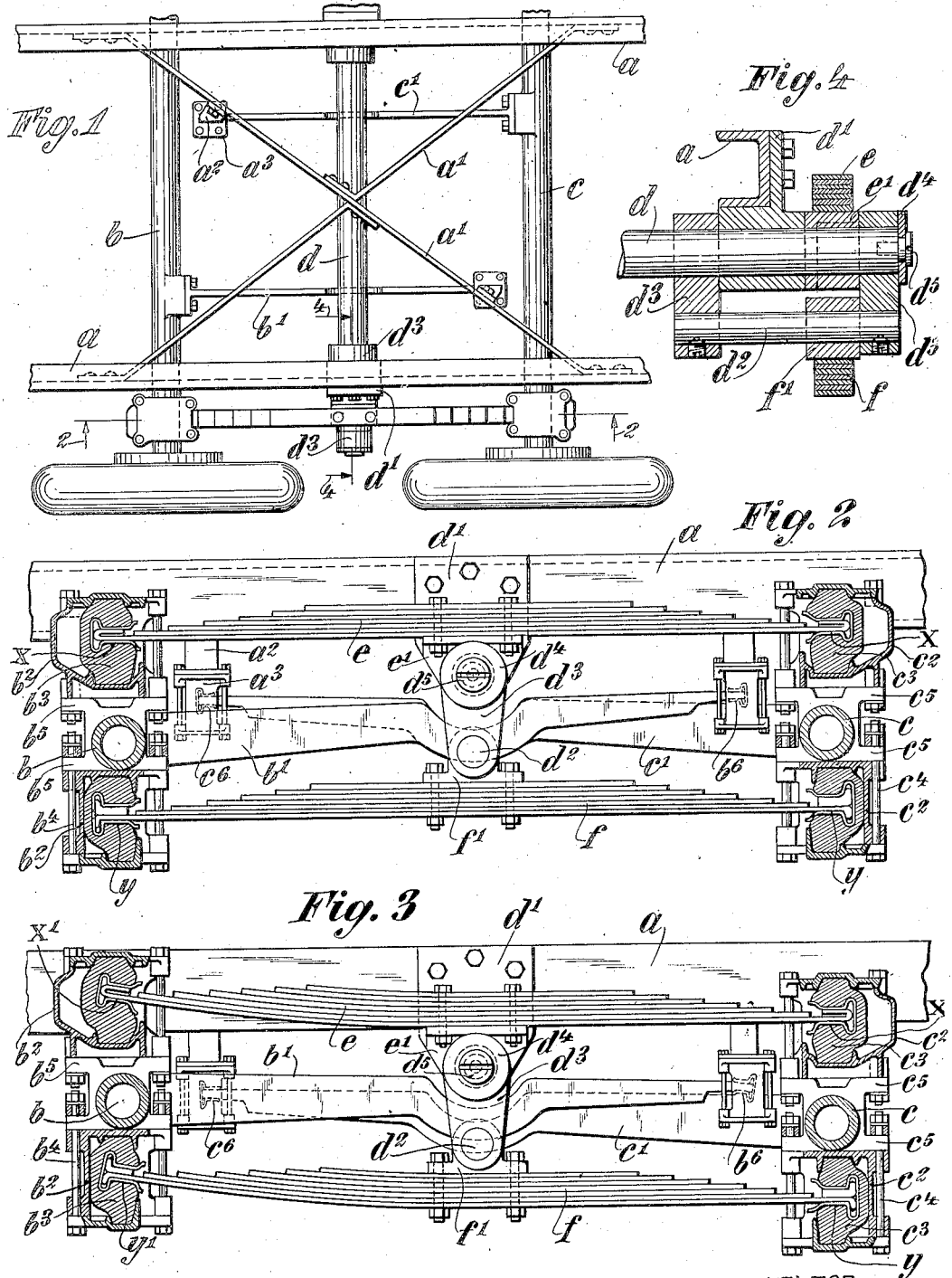

1,699,530

UNITED STATES PATENT OFFICE.

ERVING R. GURNEY, OF BEECHHURST, NEW YORK, N. Y., ASSIGNOR TO INTERNATIONAL MOTOR COMPANY, OF NEW YORK, N. Y., A CORPORATION OF DELAWARE.

SPRING SUSPENSION FOR A SIX-WHEEL CHASSIS.

Application filed June 13, 1927. Serial No. 198,502.

The present invention relates to spring suspensions for vehicles, particularly of the six wheel type, wherein four rear wheels are used, the latter being mounted to form a suitable truck. In suspensions of this character it is highly desirable to provide a rugged structure and, accordingly, a radius rod is necessary for each axle.

It will be apparent that with each axle functioning independently in transverse vertical planes, and each being secured separately to the frame, the relative movement between axles becomes very great and it is exceedingly difficult to design a truck which satisfactorily takes care of the extreme conditions imposed upon it.

The present invention proposes to utilize non-metallic yielding connections between the springs and axles of a four wheel truck construction of the above character and provide a design which will effectively operate under the above conditions to accommodate extreme relative movements between the axles without sacrificing the necessary strength of parts and connections. In using non-metallic material in the connections as noted above to absorb the shocks and stresses due to relative movements between the parts, it is highly desirable to eliminate all rubbing of a part with respect to the non-metallic material and this problem is most baffling where two parts, so connected, are mounted to move about different centers. This condition exists where the axle is connected to the frame through a torque arm and a spring is connected to the axle and mounted at a different point on the frame.

By designing the truck so that, under normal load, the center line between the point on the frame at which the torque arm is connected and the point of contact of the spring end and the non-metallic material at the axle to which such spring is connected, will pass through the pivot center of the spring, the radius of spring movement and torque arm movement will be coincident under such normal load, and, therefore, the relative movement between axle and spring will be reduced to a minimum under normal operating conditions.

Other and further objects will appear as the description proceeds and reference will now be had to the accompanying drawings for a more detailed description of the invention, wherein:

Figure 1 is a plan view, partly broken away, of a preferred form of the invention.

Figure 2 is a view, partly in section on line 2—2 of Figure 1, and looking in the direction of the arrows.

Figure 3 is a view, similar to Figure 2, but showing the forward axle in an abnormal position, such as taken when passing over an irregularity in the surface of the road.

Figure 4 is a section taken on line 4—4 of Figure 1.

Figure 5:
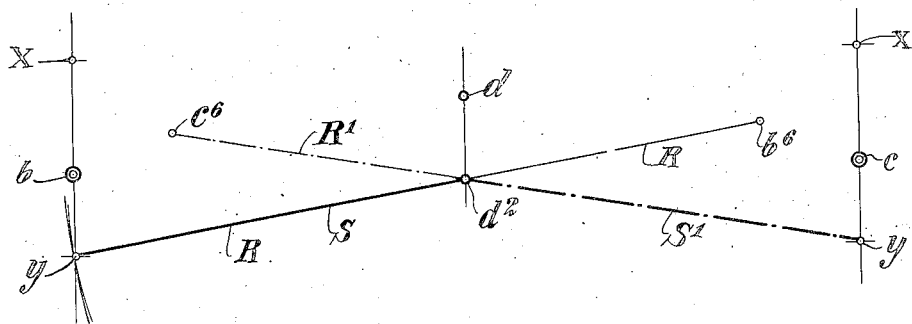
Figure 5 is a diagrammatical illustration of the condition existing in the construction as shown in Figure 2.

Referring to the drawings, $a$ indicates the side frames of the vehicle, $a'$ the cross strut for mounting the torque arms, $a^2$ the brackets secured to the cross struts and $a^3$ the housings carried by the brackets for receiving the ends of the torque arms. Within these housings $a^3$, is disposed yielding non-metallic material to secure the torque arms yieldingly to the cross struts. The rubber in these housings is of the shackle type, that is, of the type permitting a degree of longitudinal movement of the arm with respect to the housing, thereby permitting the arcs later referred to, to follow, more closely, the same path than if held firmly.

At $b$ is indicated the forward axle of the rear truck, it being spaced with respect to housing $a^3$ by means of a torque arm $b'$. $c$ indicates the rear axle which, in turn, is spaced from its housings $a^3$ by means of a torque arm $c'$. The axles $b$ and $c$ are carried under the frame by means of a pair of springs at either side thereof, the mounting being as follows. Upon the axles are formed flats $b^5$ and $c^5$, respectively, which mount suitable housings $b^2$ and $c^2$. Within these housings are carried yielding non-metallic blocks $c^3$ which receive the ends of the springs $e$ and $f$. the specific construction whereby the springs are so received in the housings forms no part of the present invention and further description thereof is believed unnecessary. The housings $b^2$ and $c^2$ are secured to the flats $b^5$ and $c^5$ by means of bolts $b^4$ as clearly shown in Figures 2 and 3. Partciular attention is directed to the fact that separate torque arms are used to transmit the driving and braking reactions to the frame independently. This prevents the tendency of the axles to rotate as a unit about the spring centers, putting more load on the front axle when braking and the rear axle when driving.

Mounted upon the frame $a$ by means of brackets $d'$, is a pivoting axle $d$ which carries the entire weight of the frame. The upper spring $e$ is mounted upon a bracket $e'$ which is pivoted directly upon the pivoting axle $d$ and the lower spring $f$ is mounted upon a second pivoting shaft $d^2$ by means of a bracket $f'$. The shaft $d^2$ is spaced from the pivoting axle $d$ by means of links $d^3$ which are spaced by the brackets $d'$ and $e'$. A screw and washer $d^4$ and $d^5$, respectively, may be used to secure the assembled construction together to prevent the elements from being separated.

It will be apparent that the construction set forth above is highly flexible, due to the ability of the linkage connecting the centers of the springs together, to accommodate a great amount of pivoting movement between the several elements. The links $d^3$, pivoting axle $d$, housings $a^3$ and housings $b^2$ and $c^2$ are so constructed with respect to the lengths of the springs and torque arms that, under normal load, the lines passing through the points at the spring ends, at which the load is carried by the cushioning elements $b^3$ and $c^3$, and the points in the housings $a^3$, at which the torque arms are secured, will pass through the respective centers of the pivoting axle $d$ and shafts $d^2$. In Figures 2 and 3, $b^6$ and $c^6$ designate, respectively, the points of connection of torque arms $b'$ and $c'$ with the respective housings $a^3$. Also, in these figures, $x$ and $y$ indicate the points at which the load carried by the springs is applied to the cushioning elements $b$.

Figure 6:
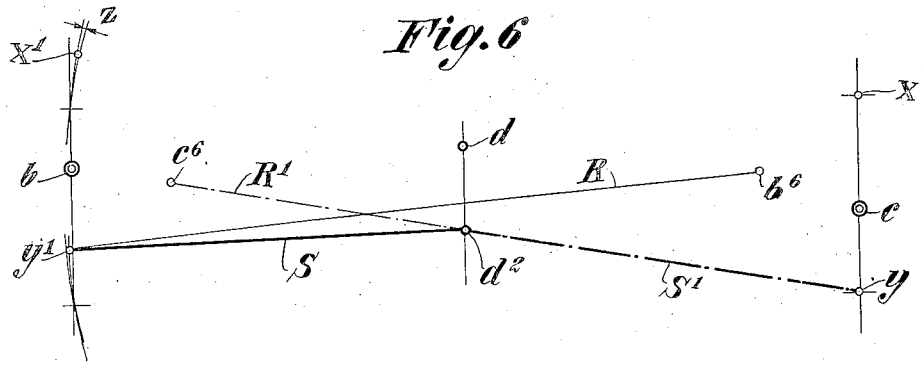
Figure 6 is a similar illustration of the condition existing in Figure 3.
Figure 7:
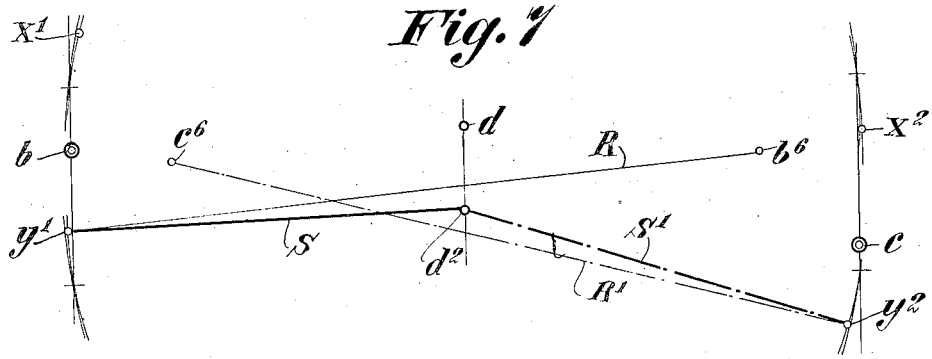
Figure 7 is an illustration of the condition existing when the forward axle is raised, as in Figure 3, and the rear axle lowered a similar amount.

Referring particularly to Figures 5, 6 and 7, Figure 5 indicates the condition shown when the elements are in the position indicated in Figure 2. Under these conditions, line R designates the radius rod center line which extends from point $b^6$, the point at which it is secured in the housing $a^3$ on the frame, to point $y$, the point of application of the load upon the cushioning elements $b^3$. This line passes through the pivot shaft $d^2$ as clearly indicated, so that relative movement of the truck with respect to the frame at point $y$ causes only a slight movement of the spring end with respect to the axle. The spring end moves in the path described by the radius line S, in heavy lines, while the torque arm moves in the path indicated by the arc described by the radius R in thin lines. It will be seen, from Figure 5, that slight movement of the truck with respect to the frame produces only a very slight movement of the axle with respect to the frame end, and only when such movement with respect to the frame becomes excessive, does relative movement become appreciable.

In Figure 6, the condition obtaining in Figure 3 is illustrated diagrammatically, axle $b$ being lifted as indicated. Under these conditions, the relative movement between the housing and the spring is designated by the reference character $z$, the lower spring end being lifted to a position $y'$, and the upper spring end to a position $x'$.

Figure 7 shows the condition existing when the rear axle is lowered the same amount that the front axle is raised in Figure 6, and further description of this condition is deemed unnecessary in view of the obvious showing.

It will be seen from the above description, that a spring suspension has been provided which reduces relative movement between the connected parts to a minimum, and only extreme conditions where the torque arm has moved an appreciable extent in accordance with the radius line R in Figures 6 and 7, and the spring a like amount in accordance with the shorter radius S in the same figures will such movement become noticeable. The principle involved in the above construction may obviously be embodied in other designs and arrangements of parts, and the invention is not to be limited save as defined in the appended claims.

What I claim is:

1. In a dual rear axle spring suspension, front and rear axles, a spring connecting the axles at either ends thereof, means to connect the spring to the frame, torque arms for each axle, and means to connect the arms to the frame at points on the opposite sides of the connections of the spring to the frame from the connections of the spring to the axles such that lines from such points through the several points of connection of the opposite spring ends with the respective axles, pass through the point at which the spring is connected to the frame when the spring is normally loaded.

2. In a dual rear axle spring suspension, front and rear axles, a spring connecting the axles at either ends thereof, through yielding non-metallic means, means to connect the spring to the frame, torque arms for each axle and means to connect the arms to the frame through yielding non-metallic means at points such that lines from such points through the points of connection of the spring ends with the respective axles, pass through the point at which the spring is connected to the frame when the spring is normally loaded.

3. In a dual rear axle spring suspension, front and rear axles, a plurality of springs connecting the axles at either ends thereof, means to connect the springs to the frame, torque arms for each axle and means to connect the arms to the frame at points such that lines from such several points through the points of connection of the spring ends at each axle, pass through the points at which the respective springs are connected to the frame when the springs are normally loaded.

4. In a dual rear axle spring suspension, front and rear axles, springs above and below the axles and connecting the same at either ends thereof, means to connect the springs to the frame, torque arms for each axle and means to connect the arms to the frame at points such that lines from such points through the several points of connection of the spring ends at each axle, pass through the points at which the respective springs are connected to the frame when the springs are normally loaded.

5. In a dual rear axle spring suspension, front and rear axles, springs above and below the axles at either ends thereof, means for connecting the spring ends and axles through yielding non-metallic material to permit relative movement therebetween, means for connecting the springs to the frame, torque arms for each axle and means for connecting the arms to the frame at several points such that lines from such points through the points of connection of the spring ends at each axle, pass through the points at which the respective springs are connected to the frame when the springs are normally loaded.

6. In a dual rear axle spring suspension, front and rear axles, a plurality of springs connecting the axles at either ends thereof, means to connect the springs pivotally to the frame, torque arms for each axle and means to connect the arms to the frame at points such that lines from such points through the several points of connection of the spring ends at each axle, pass through the points at which the respective springs are connected to the frame when the springs are normally loaded.

7. In a dual rear axle spring suspension, front and rear axles, springs above and below the axles at either ends thereof, means for connecting the spring ends and axles through yielding non-metallic material to permit relative movement therebetween, means for connecting the springs pivotally to the frame, torque arms for each axle and means for connecting the arms to the frame at points such that lines from such points through the several points of connection of the spring ends at each axle, pass through the points at which the respective springs are connected to the frame when the springs are normally loaded.

8. In a dual rear axle spring suspension, front and rear axles, a plurality of springs connecting the axles at either ends thereof, means to connect one of the springs pivotally to the frame, independent means to connect another of the springs pivotally to the frame, torque arms for each axle and means to connect the arms to the frame at points such that lines from such points through the several points of connection of the spring ends at each axle, pass through the points at which the respective springs are connected to the frame when the springs are normally loaded.

9. In a dual rear axle spring suspension, front and rear axles, a plurality of springs connecting the axles at either ends thereof, a pivot axle carried by the frame, means to connect one of the springs pivotally to the pivot axle, means to connect another of the springs to the pivot axle, torque arms for each axle and means to connect the arms to the frame at several points such that lines from such several points through the points of connection of the spring ends at each axle, pass through the points at which the respective springs are connected to the pivot axle when the springs are normally loaded.

10. In a dual rear axle spring suspension, front and rear axles, a plurality of springs connecting the axles at either ends thereof, a pivot axle carried by the frame, means to connect one of the springs pivotally to the pivot axle, means to connect another of the springs pivotally to the pivot axle, torque arms for each axle and means to connect the arms to the frame at points such that lines from such points through the several points of connection of the spring ends at each axle, pass through the points at which the respective springs are connected to the pivot axle when the springs are normally loaded.

11. In a dual rear axle spring suspension, front and rear axles, a plurality of springs connecting the axles at either ends thereof, a pivot axle carried by the frame, means to connect one of the springs pivotally to the pivot axle, means pivoted on the pivot axle and another of the springs to connect the latter to the former pivotally, torque arms for each axle and means to connect the arms to the frame at points such that lines from such several points through the points of connection of the spring ends at each axle, pass through the pivot connections on the respective springs when the latter are normally loaded.

12. In a dual rear axle spring suspension, front and rear axles, a plurality of springs connecting the axles at either ends thereof, a pivot axle carried by the frame, means to connect one of the springs pivotally to the pivot axle, a link carried by the pivot axle and connected to another of the springs, torque arms for each axle and means to connect the arms to the frame at points such that lines from such points through the several points of connection of the spring ends at each axle, pass through the pivot connections on the respective springs when the latter are normally loaded.

13. In a dual rear axle spring suspension, front and rear axles, upper and lower springs connecting the axles at either ends thereof, a pivot axle connected to the frame, a bracket secured to the upper spring and pivotally connected to the pivot axle, a pivot shaft, links connecting the pivot shaft to the pivot axle, a bracket secured to the lower spring, and means to connect the bracket to the shaft pivotally.

14. In a dual rear axle spring suspension, front and rear axles, upper and lower springs connecting the axles at either ends thereof, a pivot axle connected to the frame, a bracket secured to the upper spring and pivotally connected to the pivot axle, a pivot shaft, links connecting the pivot shaft to the pivot axle, a bracket secured to the lower spring, means to connect the bracket to the shaft pivotally, means to connect the spring ends to the axles through yielding non-metallic material to permit relative movement therebetween, torque arms for each axle, and means connecting the arms to the frame at several points such that lines from such points through the points of connection of the spring ends at each axle, pass through the pivot connections on the respective springs when the latter are normally loaded.

15. In a dual rear axle spring suspension, front and rear axles, upper and lower springs connecting the axles at either ends thereof, a pivot axle connected to the frame, a bracket secured to the upper spring and pivotally connected to the pivot axle, a pivot shaft, links connecting the pivot shaft to the pivot axle, a bracket secured to the lower spring, means to connect the bracket to the shaft pivotally, means to connect the spring ends to the axles through yielding non-metallic material to permit relative movement therebetween, torque arms for each axle, means connecting the torque arm of the rear axle to the frame forwardly thereof, and means connecting the torque arm of the forward axle to the frame rearwardly thereof, such connections being positioned so that lines from such points through the several points of connection of the spring ends at each axle, pass through the pivot connections on the respective springs when the latter are normally loaded.

This specification signed this 31st day of May A. D. 1927.

ERVING R. GURNEY.